United States Patent
Chen et al.

(10) Patent No.: US 11,611,116 B2
(45) Date of Patent: Mar. 21, 2023

(54) BATTERY PACK

(71) Applicant: Contemporary Amperex Technology Co., Limited, Ningde (CN)

(72) Inventors: Xingdi Chen, Ningde (CN); Kaijie You, Ningde (CN); Peng Wang, Ningde (CN); Yu Tang, Ningde (CN); Long Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 114 days.

(21) Appl. No.: 16/838,067

(22) Filed: Apr. 2, 2020

(65) Prior Publication Data

US 2021/0005941 A1    Jan. 7, 2021

(30) Foreign Application Priority Data

Jul. 5, 2019  (CN) .......................... 201910603742.6

(51) Int. Cl.
*H01M 10/613*   (2014.01)
*H01M 10/6556*  (2014.01)
(Continued)

(52) U.S. Cl.
CPC ..... *H01M 10/613* (2015.04); *H01M 10/6554* (2015.04); *H01M 10/6556* (2015.04); *H01M 10/6567* (2015.04); *H01M 50/636* (2021.01); *H01M 50/103* (2021.01); *H01M 50/209* (2021.01); *H01M 50/271* (2021.01); *H01M 2220/20* (2013.01)

(58) Field of Classification Search
None
See application file for complete search history.

(56) References Cited

U.S. PATENT DOCUMENTS 4,009,322 A    2/1977  Wolf
5,392,873 A    2/1995  Masuyama et al.
(Continued)

FOREIGN PATENT DOCUMENTS

CN    102104122 A    6/2011
CN    103579702 A    2/2014
(Continued)

OTHER PUBLICATIONS

European Examination Report issued in European Application No. 20165540.4, dated Mar. 2, 2021, 5 pages.
(Continued)

*Primary Examiner* — Lisa S Park
(74) *Attorney, Agent, or Firm* — Sterne, Kessler, Goldstein & Fox P.L.L.C.

(57) ABSTRACT

A battery pack includes a case and a battery module. The case includes an accommodating cavity and a drain hole in communication with the accommodating cavity. The battery module is mounted inside the accommodating cavity. A reservoir cavity is provided below the battery module to store a liquid, and in communication with the drain hole. A reservoir cavity is provided, such that the liquid can flow into a reservoir portion to prevent dangers such as short-circuit occurring in the battery module inside the case, and optimize the structure and performance of the battery pack when liquid is accumulated inside the case.

11 Claims, 8 Drawing Sheets

(51) Int. Cl.
H01M 10/6567 (2014.01)
H01M 10/6554 (2014.01)
H01M 50/636 (2021.01)
H01M 50/103 (2021.01)
H01M 50/271 (2021.01)
H01M 50/209 (2021.01)

(56) References Cited

U.S. PATENT DOCUMENTS

| | | | |
|---|---|---|---|
| 8,733,488 | B2 | 5/2014 | Umetani |
| 8,795,867 | B2 | 8/2014 | Kim |
| 9,350,000 | B2 | 5/2016 | Hayashi et al. |
| 9,979,006 | B2 | 5/2018 | Jin |
| 2002/0076604 | A1 | 6/2002 | Matsuoka et al. |
| 2011/0300428 | A1* | 12/2011 | Sohn ............... H01M 10/4207 429/120 |
| 2012/0121959 | A1* | 5/2012 | Yamada ............... H01M 50/20 429/100 |
| 2014/0335388 | A1 | 11/2014 | Jin |

FOREIGN PATENT DOCUMENTS

| | | |
|---|---|---|
| CN | 103947025 A | 7/2014 |
| CN | 206407367 U | 8/2017 |
| CN | 107845751 A | 3/2018 |
| CN | 207183466 U | 4/2018 |
| CN | 207398187 U | 5/2018 |
| CN | 207530035 U | 6/2018 |
| CN | 209963138 U | 1/2020 |
| EP | 2597700 A1 | 5/2013 |
| JP | H09-2080 A | 1/1997 |
| JP | H11-16555 A | 1/1999 |
| JP | 2000021438 A | 1/2000 |
| JP | 2007-027011 A | 2/2007 |
| JP | 2013-086641 A | 5/2013 |
| JP | 2013199185 A | 10/2013 |
| JP | 2018055972 A | 4/2018 |
| KR | 10-2013-0056932 A | 5/2013 |
| WO | 2010064255 A1 | 6/2010 |
| WO | 2012076808 A1 | 6/2012 |
| WO | WO-2012076808 A1 * | 6/2012 .......... H01M 50/342 |
| WO | 2013/077604 A1 | 5/2013 |
| WO | 2013/080385 A1 | 6/2013 |
| WO | WO2014/030339 * | 2/2014 |

OTHER PUBLICATIONS

Extended European Search Report issued in European Patent Application No. 20/165,540 4, dated Jul. 28, 2020, 20 pages.
Japanese Office Action issued in Japanese Application No. 2019-157852, dated Aug. 27, 2020, 11 pages.

* cited by examiner

BATTERY PACK

CROSS-REFERENCE TO RELATED APPLICATIONS

This disclosure claims priority to Chinese Patent Application No. 201910603742.6 filed Jul. 5, 2019, the disclosures of which are hereby incorporated in their entirety by reference.

FIELD OF THE INVENTION

The present disclosure relates to the field of a battery, and in particular to a battery pack.

DESCRIPTION OF RELATED ART

The battery pack comprises a battery module, a case for mounting the battery module, and a cooling system for radiation of the battery module. The battery module is mounted inside the case.

The inventors have found that: there might be water accumulated within the case, or there might be a leakage phenomenon in the cooling system inside the case in rainy or other wetted occasions. These conditions are likely to cause short-circuit between the positive and negative electrodes of the battery module.

SUMMARY OF THE INVENTION

The present disclosure proposes a battery pack, for optimizing the structure of the battery pack.

The embodiments of the present disclosure provide a battery pack, comprising:
a case, comprising an accommodating cavity and a drain hole in communication with the accommodating cavity; and
a battery module mounted inside the accommodating cavity;
wherein a reservoir cavity is provided below the battery module to store a liquid, and in communication with the drain hole.

In some embodiments, the battery pack further comprises:
a reservoir portion disposed outside the case;
wherein the reservoir portion is provided with the reservoir cavity, or the reservoir portion and the case jointly form the reservoir cavity.

In some embodiments, the reservoir portion is mounted below a wall of the case provided with the drain hole, and sealingly connected with the wall; wherein the reservoir portion and the wall enclose the reservoir cavity.

In some embodiments, the reservoir portion is provided with an inner concave portion recessed in a direction away from the case.

In some embodiments, wherein there are a plurality of the drain hole, and the inner concave portion is located outside all of the drain holes and covers all of the drain holes.

In some embodiments, the battery pack further comprises:
a protection portion mounted on one side of the reservoir portion away from the case.

In some embodiments, the protection portion has a hardness greater than that of the reservoir portion, and the protection portion entirely covers the reservoir portion.

In some embodiments, the case comprises:
a first case; and
a second case enclosing the accommodating cavity with the first case and located below the first case; wherein the drain hole is provided in the second case.

In some embodiments, the second case comprises:
a case body; and
a carrier disposed inside the case body; wherein the carrier divides an inner space of the case into an accommodating cavity and a reservoir cavity; the carrier is provided with the drain hole, and the battery module is carried by the carrier.

In some embodiments, a bottom of the case body is provided with an inner concave area recessed in a direction away from the first case, and the carrier is connected with an edge of the recessed area.

In some embodiments, the battery module comprises:
a battery cell assembly comprising a plurality of battery cells arranged side by side;
a cooling system abutting against the plurality of battery cells and configured to cool each of the battery cells; and
wherein the drain hole is configured to discharge a fluid leaked by the cooling system.

In some embodiments, the cooling system comprises:
at least two cooling plates in which cooling flow passages;
a connecting pipe in communication with cooling flow passages of each of the cooling plates; and
wherein the drain hole is adjacent to a connection of the cooling plate and the connecting pipe.

In some embodiments, all the battery cells of the battery module are arranged along a length direction of the case, and a maximum lateral surface of each of the battery cells and the wall in which the drain hole of the case is located face towards each other.

In some embodiments, there are a plurality of holes arranged along a width direction of the case.

In some embodiments, the size of one opening of the drain hole on one end in communication with the accommodating cavity is greater than the size of an opening of the drain hole on the other end in communication with the reservoir portion.

In the above-described technical solution, the battery pack has a case and a battery module disposed inside an accommodating cavity of the case. During actual use of the battery pack, there might be liquid inside the accommodating cavity of the case. In order to prevent the liquid from contacting the positive and negative electrodes of the battery module to cause short-circuit in the battery module, in the above-described technical solution, a reservoir portion is provided below the battery module, and in communication with the accommodating cavity of the case via a drain hole, such that the liquid in the accommodating cavity may be discharged into the reservoir cavity via the drain hole.

BRIEF DESCRIPTION OF THE DRAWINGS

The accompanying drawings described herein are used to provide a further understanding of the present disclosure and constitute a part of the present application. The illustrative embodiments of the present disclosure as well as the illustrations thereof, which are used for explaining the present disclosure, do not constitute improper definitions on the present disclosure. In the accompanying drawings.

DESCRIPTION OF THE INVENTION

The technical solution provided by the present disclosure will be described in more detail below in conjunction with FIGS. 1 to 16.

Figure 1:
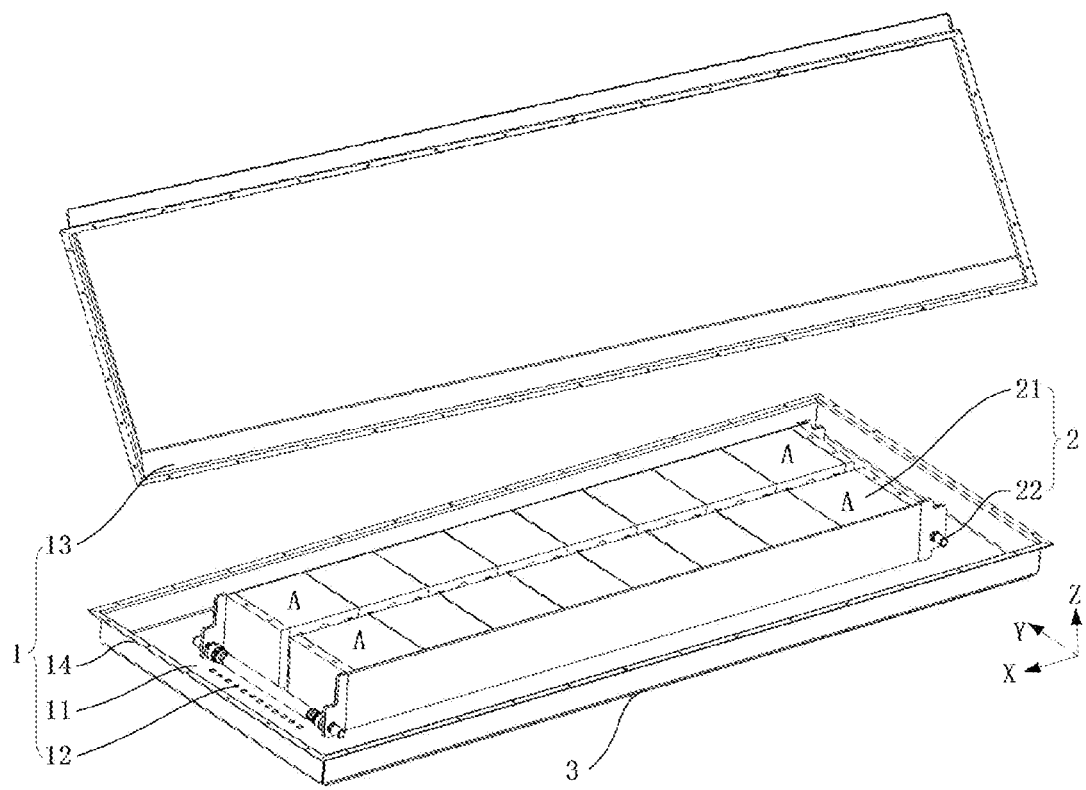
FIG. 1 is a schematic perspective structural view of a battery pack provided by some embodiments of the present disclosure.

In order to more clearly describe the technical solutions of various embodiments of the present disclosure, a coordinate system is established in FIG. 1, and subsequent descriptions of the respective orientations of the battery pack are made based on the coordinate system. Referring to FIG. 1, the X-axis is a length direction of the battery pack. The Y axis is perpendicular to the X axis within a horizontal plane, and the Y axis represents a width direction of the battery pack. The Z axis is perpendicular to a plane formed by the X axis and the Y axis, and the Z axis represents a height direction of the battery module. In the description of the present disclosure, the terms "above" and "below" are both defined relative to the Z-axis direction. The length direction of the case 1 coincides with that of the battery pack, the width direction of the case 1 coincides with that of the battery pack, and the height direction of the case 1 coincides with that of the battery pack.

In the description of the present disclosure, the azimuth or positional relations indicated by the terms "top", "bottom", "within", "outside", which are based on the azimuth or positional relations illustrated by the drawings, are only for facilitating description of the present disclosure and simplifying the description, rather than indicating or implying that the device or element referred thereto has to present a particular azimuth, and be constructed and operated in a particular azimuth, so that it cannot be understood as limiting the protected content of the present disclosure.

Figure 2:
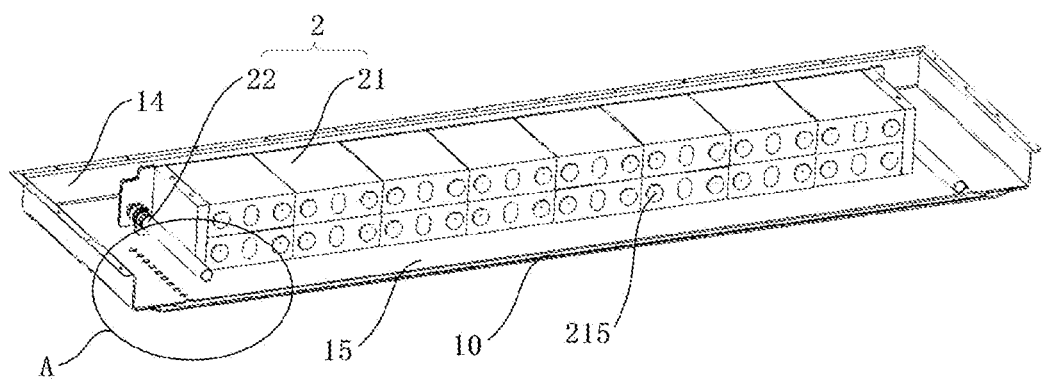
FIG. 2 is a schematic perspective structural view of a partial structure of a battery pack provided by some embodiments of the present disclosure.

Referring to FIG. 1, FIG. 1 shows a schematic partial perspective structural view of the battery pack, in which the case 1 is in an open state. Referring to FIG. 2, one lateral wall of the second case 14 of the case 1 described later is removed in FIG. 2 to clearly show the structure of the battery module 2 inside the case 1 as well as the positional relationship between the battery module 2 and the second case 14.

Figure 3:
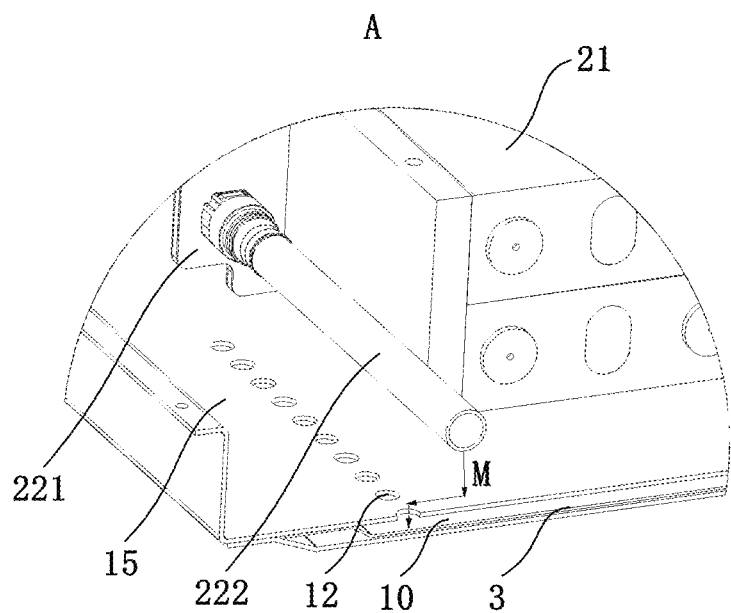
FIG. 3 is a partially enlarged schematic view of A in FIG. 2.

Referring to FIGS. 1 to 3, the embodiments of the present disclosure provide a battery pack, which comprises a case 1 and a battery module 2. The case 1 comprises an accommodating cavity 11 and a drain hole 12 in communication with the accommodating cavity 11. The battery module 2 is mounted inside the accommodating cavity 11. Wherein, a reservoir cavity 10 for storing a liquid is provided below the battery module 2, and in communication with the drain hole 12. The term "below" mentioned here is immediately below or obliquely below, so that the liquid inside the accommodating cavity 11 flows through the drain hole 12 into the reservoir cavity 10 under the effect of gravity.

The reservoir cavity 10 is for example located inside the case, or the reservoir cavity 10 is outside the case 1, or part of the reservoir cavity 10 is inside the case and the other part of the reservoir cavity 10 is outside the case. Specifically, there are three positions for providing the reservoir cavity 10: the first is that the reservoir cavity 10 is completely located inside the case 1; the second is that the reservoir cavity 10 is completely located outside the case 1; the third is that the reservoir cavity 10 has one part located inside the case 1 and the other part located outside the case 1. The various implementations will be described specifically later.

In the above-described technical solution, the battery pack is provided with a reservoir cavity 10, which is located below a gravity direction of the battery module 2. When there is liquid accumulated within the accommodating cavity 11, the accumulated liquid flows downward under the effect of gravity, to the drain hole 12, and into the reservoir cavity 10 via the drain hole 12 for storage. In the above-described technical solution, since the reservoir cavity 10 is disposed below the battery module 2, the short-circuit phenomenon of the battery module 2 caused by the fluid within the accommodating cavity 11 is reduced or even avoided, thereby improving the operational reliability of the battery pack. Moreover, the above-described technical solution is not limited by a placing height of the battery module 2, and in the case of a low height of the battery module 2 and a low position of the electrode terminal thereof, the short-circuit risk of the battery module 2 is reduced, thereby improving the operational reliability of the battery pack.

Next, the respective constituent parts of the battery pack will be introduced in detail with reference to the accompanying drawings.

First, the implementation of the case 1 will be introduced.

Referring to FIGS. 1 to 3, in some embodiments, the case 1 comprises a first case 13 and a second case 14. The second case 14 and the first case 13 enclose an accommodating cavity 11, and the second case 14 is located below the first case 13. The drain hole 12 is provided in the second case 14.

The first case 13 and the second case 14 are locked together to form the above-described accommodating cavity 11. In some embodiments the first case 13 and the second case 14 use other detachable connection means such as bolt connection. For example, the case 1 is formed by a mosaic of two case halves, which on the one hand facilitates mounting, replacing, repairing and servicing various members within the accommodating cavity 11 of the case 1, and on the other hand also makes it easier to manufacture and machine the case 1. Moreover, the case 1 has a regular structure, so that the battery pack is conveniently mounted to the vehicle.

Referring to FIG. 1, the case 1 is configured to mount the battery module 2. The case 1 and the battery module 2 are detachably connected therebetween, for example, a connecting frame is mounted on the inner wall of the case 1, and a connecting member is disposed on the battery module 2, such that the connecting frame and the connecting member are detachably connected by bolts or the like. By using the above-described implementation, the connection between the battery module 2 and the case 1 is stable and reliable, so that the battery pack has a reliable structure.

Referring to FIG. 1, the drain hole 12 described above is provided at the bottom of the second case 14. When there is liquid accumulated inside the accommodating cavity 11, the fluid within the accommodating cavity 11 automatically flows out of the accommodating cavity 11 via the drain hole 12 under the effect of self-gravity, thereby effectuating automatic draining of the liquid accumulated within the accommodating cavity 11.

Referring to FIGS. 1 to 7, the relevant content of the battery module 2 will be introduced below.

The battery module 2 comprises a battery cell assembly 21 and a cooling system 22. The battery cell assembly 21 comprises a plurality of battery cells 210 arranged side by side. The plurality of battery cells 210 are electrically connected to each other. The cooling system 22 is configured to cool the battery cell assembly 21 of the battery module 2. The cooling system 22 is filled with a fluid for cooling. There might be a leakage phenomenon at the connection of various members of the cooling system 22. The drain hole 12 is configured to discharge the fluid leaked by the cooling system 22, so that there is seldom or even no liquid accumulated inside the case 1, thereby reducing or even eliminating the short-circuit risk of the battery pack.

Figure 7:
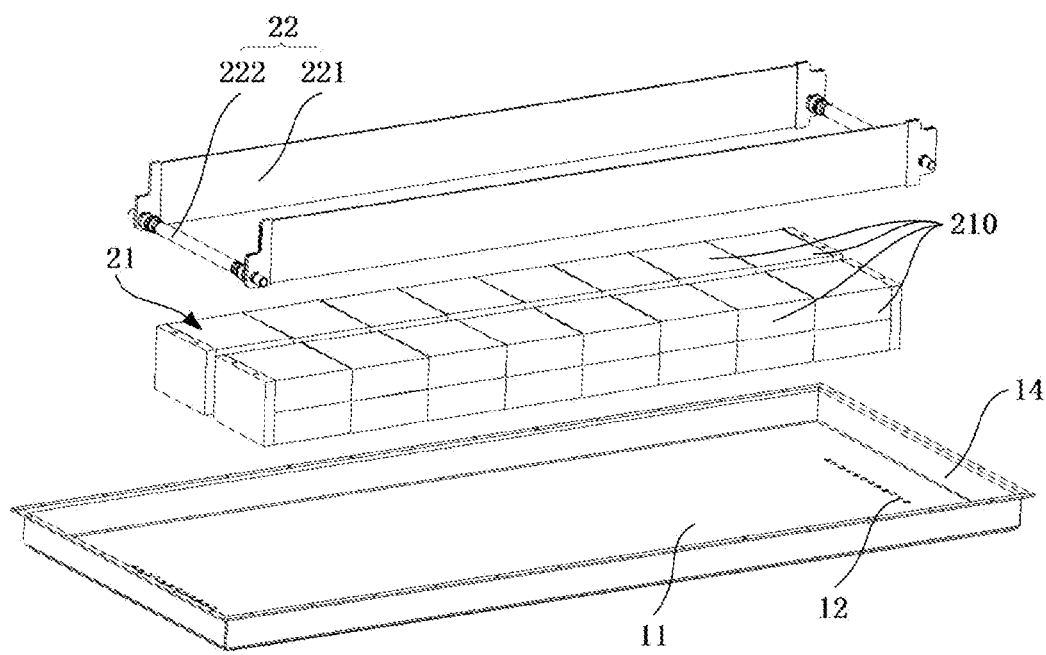
FIG. 7 is a schematic exploded structural view of a partial structure of a battery pack provided by some embodiments of the present disclosure.

Referring to FIGS. 1 and 7, the battery module 2 comprises a plurality of battery cell assemblies 21, which are provided to be connected in series, in parallel or both for the electrical connection manner, so as to realize the electrical properties required for the battery pack.

Figure 4:
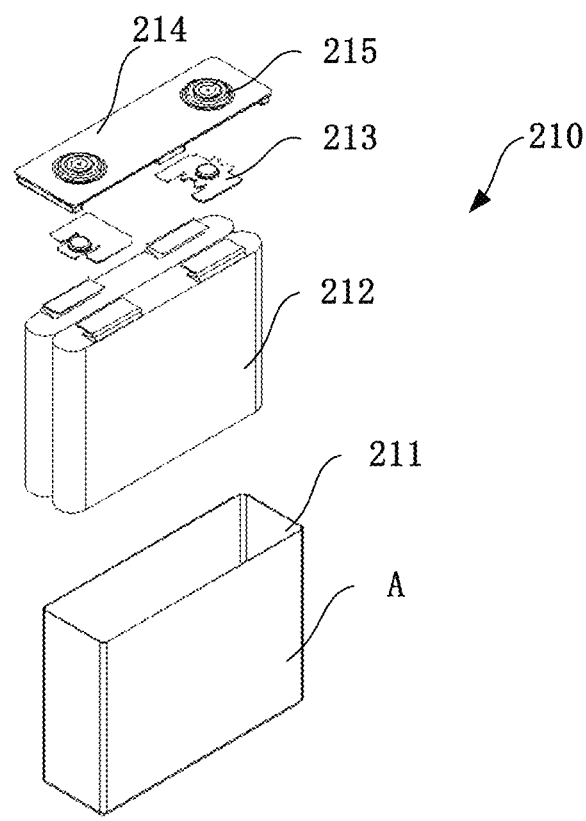
FIG. 4 is a schematic structural view of a battery cell of a battery pack provided by some embodiments of the present disclosure.
Figure 5:
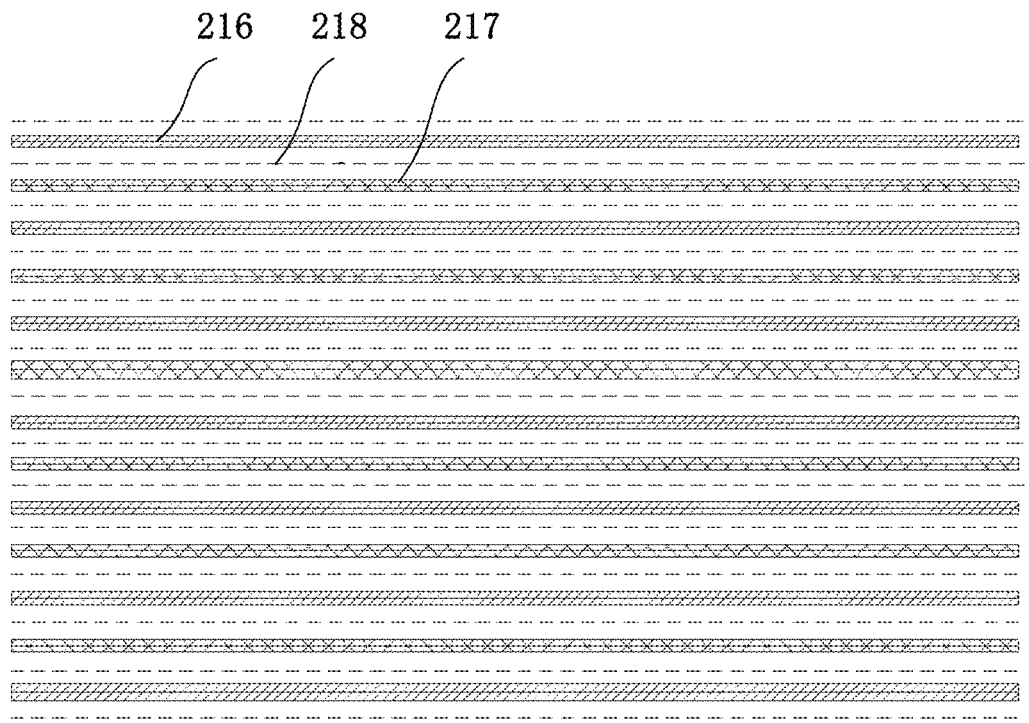
FIG. 5 is a schematic structural view of a laminated electrode assembly.
Figure 6:
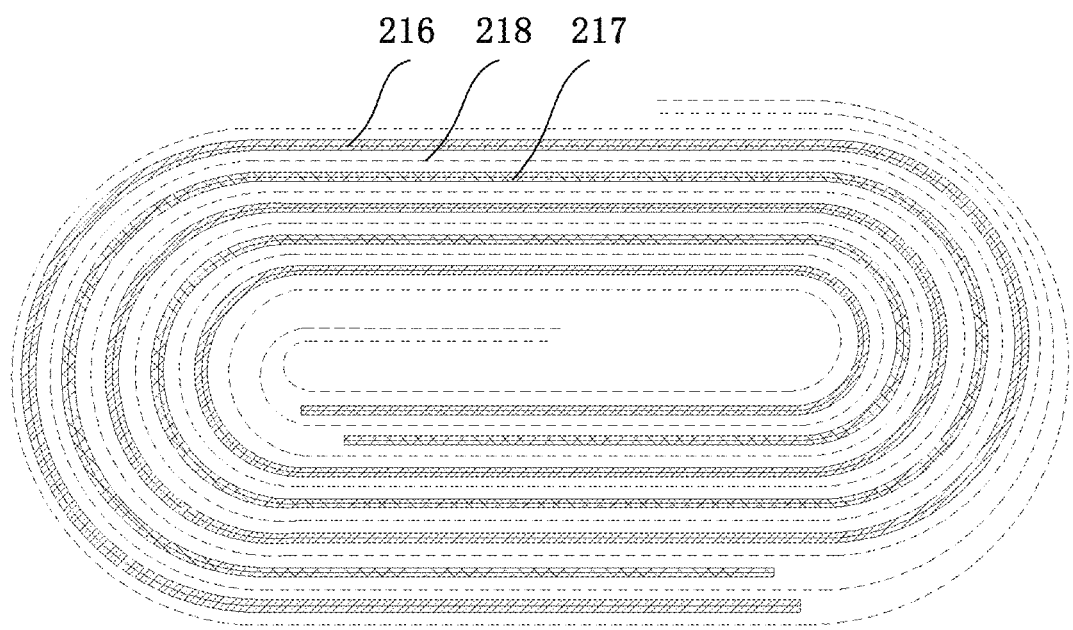
FIG. 6 is a schematic structural view of a wound electrode assembly.

Referring to FIGS. 4 to 6, the structure of the battery cell 210 will be described below.

Referring to FIG. 4, the battery cell 210 comprises a housing 211, an electrode assembly 212 disposed within the housing 211, a connecting member 213 disposed at an end of the electrode assembly 212, and a cover place 214 covering the connecting member 213 and the end of electrode assembly 212. The cover plate 214 is provided with an electrode terminal 215.

The housing 211 is closed at one end and open at the other end. The cover plate 214 is disposed at an opening of the housing 211. The electrode assembly 212 is mounted to an interior of the housing 211 via the opening. The maximum lateral surface of the electrode assembly 212 and that of the housing 211 face towards each other, and the maximum lateral surface of the housing 211 serves as the maximum lateral surface A of the battery cell.

The manufacturing manner of the electrode assembly 212 comprises a laminated manner and a wound manner. As shown in FIG. 5, the laminated electrode assembly 212 is to tailor the positive electrode tab 216, the negative electrode tab 217, and the diaphragm 218 into a size having a specified dimension, and subsequently laminate the positive electrode tab 216, the diaphragm 218, and the negative electrode tab 217 into the electrode assembly 212. As shown in FIG. 6, the wound electrode assembly 212 is to wind the positive electrode tab 216, the negative electrode tab 217, and the diaphragm 218 to form a shape.

The maximum surface of the laminated electrode assembly 212 and the wound electrode assembly 212 is the surface having the largest expansion ratio. The battery cell 210 introduced later is laid flat. As shown in FIGS. 1 and 2, the placing manner effectively reduces the accumulated expansion of the battery cell assembly 21 and further reduces the accumulated expansion of the battery pack since the maximum expansion surface of the battery cell 210 is along the Z-axis direction, and the dimension of the battery module 2 along the Z-axis direction is smaller than the dimension along the X-axis or the Y-axis direction.

Referring to FIGS. 1, 2 and 7, the arrangement manners of the respective battery cells 210 of the battery cell assembly 21 will be introduced below.

With reference to FIGS. 1, 2 and 7, a plurality of battery cells 210 are arranged along a length direction of the case 1, and a maximum lateral surface of each of the battery cells 210 and the wall 15 in which the drain hole 12 of the case 1 is located face towards each other.

Taking the coordinate system shown in FIG. 1 for example. A plurality of battery cells 210 are arranged flat along the length direction X of the case 1. That is, the maximum lateral surface A of the battery cell 210 is substantially parallel to the length direction X of the case 1, and the maximum lateral surface A of the battery cell 210 and the wall 15 of the case 1 face towards each other.

As shown in FIG. 1, two rows of battery cell assemblies 21 are provided along a width direction (i.e., the Y-axis direction) of the battery pack. In actual application, three rows or more are provided. In actual use, one or more layers of battery cell assemblies 21 are provided in the height direction of the battery pack, that is, in the Z-axis direction in FIG. 1.

The placing manner in which the maximum lateral surface A of the battery cell 210 and the wall 15 of the case 1 face towards each other is also referred to be laid flat. By using such an arrangement manner as to be laid flat, since the battery cell assembly 21 has a relatively short height in the Z direction, to reduce the overall height of the battery pack, the battery pack having such structure is more suitable for a vehicle having a relatively short space for mounting the battery pack. However, since the battery cell assembly 21 has a short height, the bus bar of the battery cell 210 is also in a low position, and the electrode terminal 215 is relatively closer to the bottom of the case 1. If the structure of the embodiments of the present disclosure is not employed, when there is leakage in the cooling system 22 inside the case 1 or liquid accumulated within the case 1, the battery cell 210 that is laid flat is more likely to be subjected to a short-circuited phenomenon.

If the above-described structure of the embodiments of the present disclosure is employed, the above-described two problems can be favorably balanced, so that the battery pack may have a relatively short height to meet the vehicle installation requirements; and also the battery pack is less likely to be subjected to a short-circuited phenomenon inside, thereby improving the performance of the battery pack. Since the battery pack has the reservoir portion 3 in communication with the accommodating cavity 11 via the drain hole 12, and the liquid accumulated within the accommodating cavity 11 readily flow out of the accommodating cavity 11 through the drain hole 12, thereby effectively reducing a possibility of a water accumulation phenomenon within the case 1, reducing and even avoiding a possibility of a short-circuit phenomenon in the battery module, and improving the performance and structure of the battery pack.

In addition, by using the above-described arrangement manner, each of the battery cells 210 of the battery module 2 is laid flat. Since the maximum expansion surface of each of the battery cells 210 comprised in the battery cell assembly 21 is along the Z-axis direction, there is less accumulated expansion of each of the battery cells 210, thereby optimizing the performance of the battery pack.

Referring to FIGS. 1 to 4, the relevant content of the cooling system 22 of the battery module 2 will be introduced below.

The cooling system 22 is disposed outside the battery cell assembly 21, and configured to cool the battery cell assembly 21. Alternatively, the cooling system 22 cools the bottom surface of the battery cell assembly 21. The bottom surface of the battery cell assembly 21 refers to a surface of each of the battery cells 210 comprised in the battery cell assembly 21 facing the top surface provided with the electrode terminal 215.

Referring to FIGS. 1 and 2, in some embodiments, two rows of battery cell assemblies 21 share a set of cooling system 22. As shown in FIG. 1, the top surfaces of the two rows of battery cell assemblies 21 provided with the electrode terminals 215 are opposite to each other, and the cooling system 22 is configured to simultaneously cool the bottom surfaces of the two rows of battery cells. Alternatively, the top surfaces of the two rows of battery cells provided with the electrode terminals 215 are away from each other. The bottom surfaces of each of the battery cells 210 of the two rows of battery cell assemblies 21 are arranged oppositely, with a gap between the two rows of battery cell assemblies 21, and the cooling plate 221 of the cooling system 22 is disposed at the gap to simultaneously cool the bottom surfaces of the two rows of battery cell assemblies 21.

Referring to FIGS. 1 to 3, to continue with the above-described, in some embodiments, the cooling system 22 comprises a cooling plate 221 and a connecting pipe 222. The cooling plates 21 are internally provided with cooling flow passages (not shown in the drawings), and have a number of two or more. The cooling plates 221 have a number of two or more. The connecting pipe 222 is connected to the cooling flow passage to connect the respective cooling plates 221. Wherein, the drain hole 12 is adjacent to a connection of the cooling plate 221 and the connecting pipe 222. Adjacent means that the drain hole 12 is relatively close to the connection between the cooling plate 221 and the connection pipe 222, so that the liquid leaking from the connection between the cooling plate 221 and the connection pipe 222 easily flow into the drain hole 12.

In some embodiments, a feeding pipe and a draining pipe may be additionally provided outside the case 1, and the cooling system 22 is in communication with both the feeding pipe and the draining pipe. The structure realizes the circulation of a coolant inside the cooling system 22, so that there is a favorable cooling effect of the battery pack.

Referring to FIGS. 1 and 3, the cooling system 22 comprises two connecting pipes 222, which are respectively located on both sides of the battery module 2 in a length direction. One or more rows of drain holes 12 are provided below a connection position of each of the connecting pipes 222 and the cooling plate 221. If there is leakage at the connection between the connecting pipe 222 and the cooling plate 221, the drain hole 12 readily drain the accumulated liquid to ensure normal use of the battery module 2 inside the case 1.

Referring to FIGS. 1 to 4, the cooling system 22 is disposed between the two end surfaces of the battery cell assembly 21, as shown in FIG. 1, that is, one of the two cooling plates 221 of the cooling system 22 cools the bottom surface of one battery cell assembly 21, and the other cooling plate 221 cools the bottom surface of the other battery cell assembly 21. The above-described arrangement implements using one set of cooling system 22, and simultaneously cooling the two battery cell assemblies 21, thereby reducing the number of the cooling members and making a lightweight structure of the battery pack.

Referring to FIGS. 1 to 3 and FIGS. 7 to 11, the relevant content of the drain hole 12 will be further introduced in detail below.

The battery module 2 is integrally mounted to one of the walls of the case 1, which is referred to as a wall 15. The drain hole 12 is also disposed in the wall 15 of the case 1. Taking the direction shown in FIG. 1 as an example, the wall 15 is the bottom wall of the case 1. Further, the drain hole 12 is located below a gravity direction of the battery module 2.

Taking the direction shown in FIG. 1 as an example, the drain hole 12 is disposed at the bottom of the case 1, so that the liquid directly flows towards the drain hole 12 under the effect of gravity and then into the reservoir cavity 10 when there is leakage in the cooling system 22 inside the case 1 described later. The flow path of the liquid is illustrated by the path M in FIG. 3.

Referring to FIGS. 1 and 7, in some embodiments, the drain holes 12 are arranged in rows in the wall 15 of the case 1, and the drain holes 12 penetrate through the wall 15.

The drain hole 12 is, for example, a circular hole, a trapezoidal hole, an irregular hole, or the like. The shape of the drain hole 12 is not limited, with a function of enabling the accumulated liquid to pass through and smoothly flow into the reservoir cavity 10. The drain hole 12 having a circular hole shape is used to facilitate the machining and manufacturing. The drain hole 12 having a trapezoidal hole is used, and the dimension at one end of the drain hole 12 in communication with the accommodating cavity 11 is greater than the dimension at the other end of the drain hole 12 in communication with the reservoir cavity 10. The structure effectively reduces a possibility of backflow of fluid within the reservoir cavity 10. The drain hole 12 having an irregular hole is used to implement randomly designing the structure, shape and dimension of the drain hole 12, so as to satisfy the personalized communicating requirements.

In some embodiments, the drain hole 12 is configured to allow liquid to flow unidirectionally from the drain hole 12 to the reservoir cavity 10. Alternatively, the drain hole 12 is provided with a direction regulating member that allows liquid to flow unidirectionally from the drain hole 12 to the reservoir portion 3.

Specifically, for example, the drain hole 12 is provided in an abnormal structure, or has a dimension at one end greater than the dimension at the other end. Alternatively, a film that prevents the backflow is provided at an end of the drain hole 12 to prevent the backflow.

In some embodiments, the dimension of the opening at one end of the drain hole 12 in communication with the accommodating cavity 11 is greater than the dimension of the opening at the other end in communication with the reservoir cavity 10. The end having a larger dimension is located upstream of the gravity direction, and the end having a smaller dimension is located downstream of the gravity direction. This structure makes it difficult for the liquid to flow back into the case 1 via the drain hole 12 when the case 1 is inverted.

By the above-described arrangement, after the liquid accumulated within the accommodating cavity 11 of the case 1 flows out into the reservoir cavity 10 via the drain hole 12, the fluid in the reservoir cavity 10 is also less likely to turn around into the accommodating cavity 11 during the use of the battery pack even if there are accidental conditions such as collision and impact, thereby reducing the short-circuit of the battery module 2 resulting from the backflow of the fluid in the reservoir cavity 10 to the accommodating cavity 11, optimizing the structure of the battery pack, and improving the performance of the battery pack.

Next, referring to FIG. 1, multiple implementations of the reservoir cavity 10 will be introduced.

Divided according to the position of the reservoir cavity 10, the reservoir cavity 10 may be located inside or outside the case 1, or partially inside the case 1 and partially outside the case 1.

The implementation of the reservoir cavity 10 located outside the case 1 will first be introduced below.

In the embodiments shown in FIG. 1, the battery pack further comprises a reservoir portion 3. The reservoir portion 3 is disposed outside the case 1. The reservoir portion 3 is separately provided with the reservoir cavity 10, or the reservoir portion 3 and the case 1 jointly form the reservoir cavity 10.

Referring to FIG. 1, the reservoir portion 3 is located outside the bottom of the case 1, and the reservoir portion 3 and the bottom wall of the case 1 are fixed together.

If the reservoir portion 3 is separately provided with the reservoir cavity 10, the reservoir portion 3 and the case 1 are also sealingly connected therebetween, so that the reservoir cavity 10 communicates with the drain hole 12, and there is no fluid leakage from the connection between the reservoir portion 3 and the case 1. The manner of implementing sealingly connecting the reservoir portion 3 and the case 1 is for example in a way such that both of them are sealingly connected directly, or for example to implement a sealed connection by providing the sealing structures that are mated with each other. Alternatively, a sealing member is sandwiched between the reservoir portion 3 and the case 1, such that the reservoir portion 3 is sealingly connected to the case 1 by the sealing member.

When the reservoir portion 3 and the case 1 jointly form the reservoir cavity 10, the reservoir portion 3 and the case 1 are also sealingly connected. There are multiple sealed connection manners. One alternative manner is that the reservoir portion 3 is sealingly connected to the case 1 directly. Another manner is that a sealing member is sandwiched between the reservoir portion 3 and the case 1, such that the reservoir portion 3 is sealingly connected to the case 1 by the sealing member. The sealing member is, for example, a sealing ring or the like. In the above-described implementation, the reservoir portion 3 is sealingly connected to the case 1, so that the liquid within the accommodating cavity 11 does not leak via the connection between the reservoir portion 3 and the case 1, thereby improving the performance of the battery pack.

As known from the above-described introduction, when located outside the case 1, there are two manners for the reservoir portion 3 to form the reservoir cavity 10:

The first is that the reservoir portion 3 itself has a structure of a closed cavity which has an inflow port in communication with the drain hole 12. The closed cavity serves as the reservoir cavity 10. In the above-described technical solution, the reservoir portion 3 is a separate member, and separately forms the reservoir cavity 10. At the time of installation, the reservoir portion 3 is sealingly fixed to the case 1, such that the reservoir cavity 10 communicates with the drain hole 12 to prevent leakage of liquid from the drain hole 12 to an area other than the reservoir cavity 10.

The second implementation is that: the reservoir portion 3 and the case 1 jointly form the reservoir cavity 10.

Figure 11:
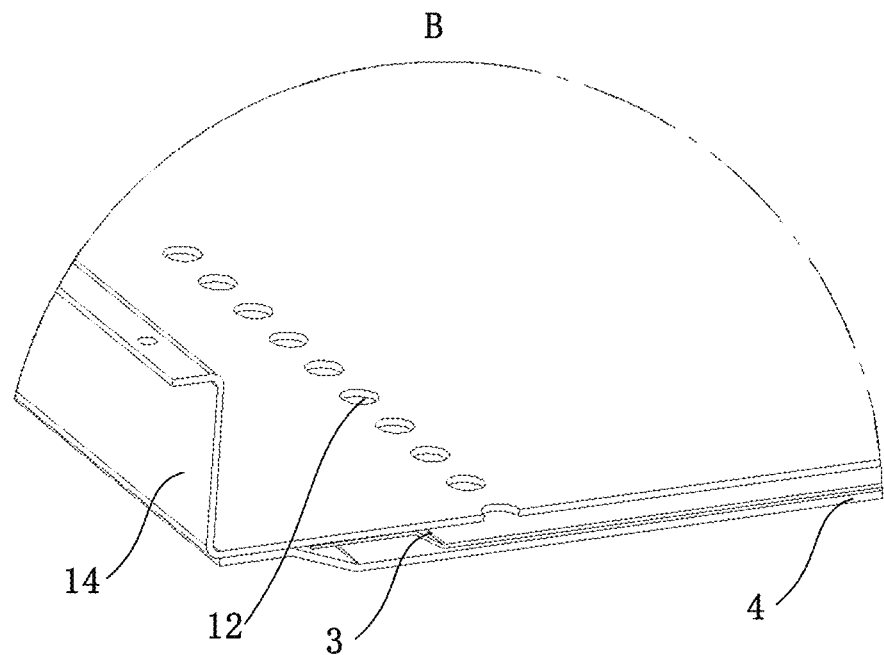
FIG. 11 is a partially enlarged schematic view of B in FIG. 10.

Referring to FIGS. 1 and 11, in some embodiments, the reservoir portion 3 is mounted outside the wall 15 of the case 1 provided with the drain hole 12, and sealingly connected to the wall 15. Wherein, the reservoir portion 3 and the outside of the wall 15 enclose the reservoir cavity 10.

If the reservoir portion 3 and the wall 15 jointly form the reservoir cavity 10, the sealed connection manner of the reservoir portion 3 and the wall 15 is similar to the sealed connection method introduced above, and thus will not be described in detail here. In the above-described implementation, the reservoir portion 3 is sealingly connected to the wall 15, so that the liquid within the accommodating cavity 11 does not leak via the connection between the reservoir portion 3 and the wall 15, thereby improving the performance of the battery pack.

Figure 8:
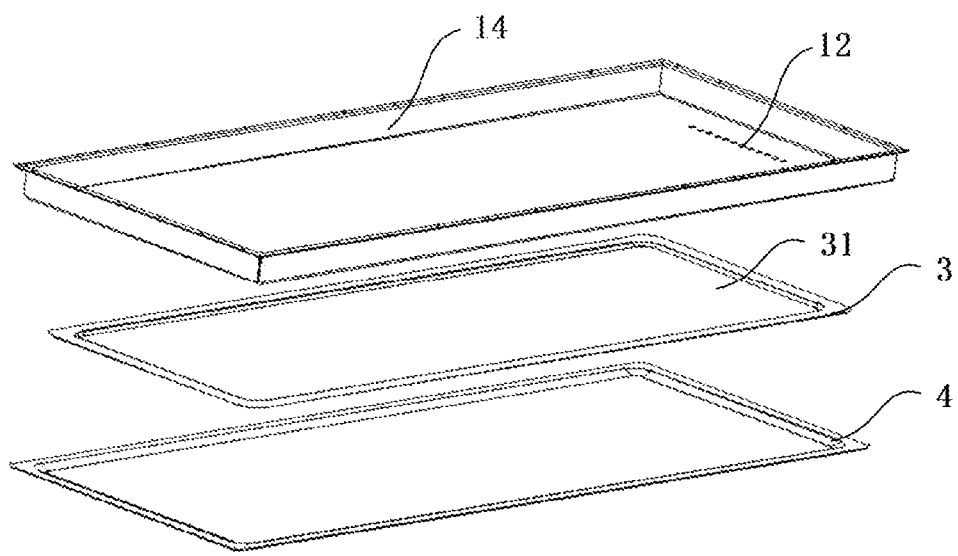
FIG. 8 is a schematic exploded view of members at a second case of the battery pack provided by some embodiments of the present disclosure.
Figure 9:
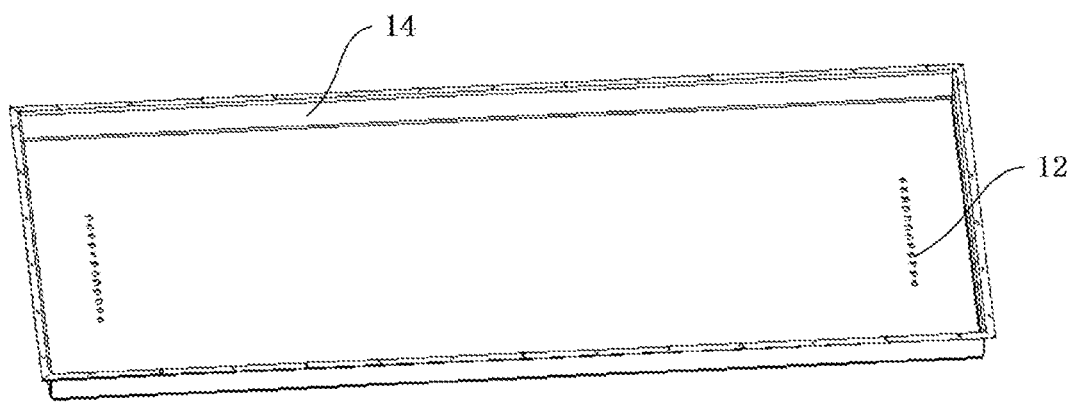
FIG. 9 is a schematic perspective structural view of a second case of a battery pack provided by some embodiments of the present disclosure.
Figure 10:
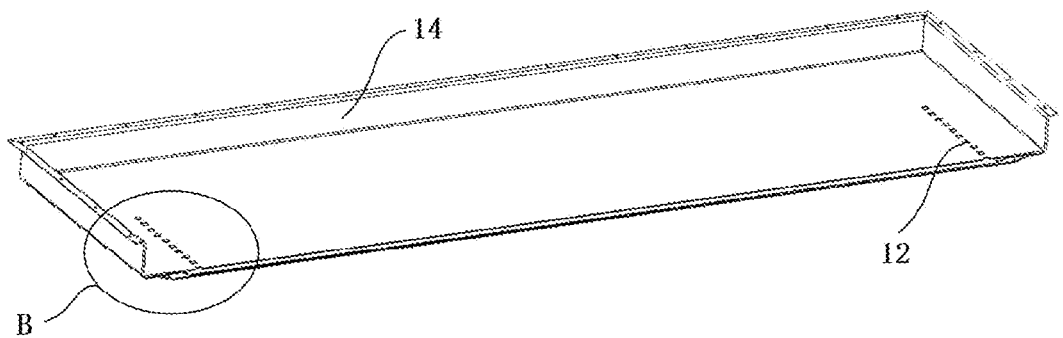
FIG. 10 is a schematic partial perspective view at a second case of the battery pack provided by some embodiments of the present disclosure.

Specifically, referring to FIGS. 1, 8 and 11, the reservoir portion 3 is provided with an inner concave portion 31, which encloses the reservoir cavity 10 with the wall 15.

In some embodiments, the inner concave portion 31 is for example plural, and a plurality of inner concave portions 31 jointly cover all of the drain holes 12.

Alternatively, in some embodiments, the inner concave portions 31 are located outside all of the drain holes 12. That is, the inner concave portions 31 completely cover all of the drain holes 12, so that the liquid within the drain hole 12 completely flows to the reservoir cavity 10.

The inner concave portion 31 provided in one of the reservoir portions 3 is, for example, plural, and a plurality of inner concave portions 31 of the same reservoir portion 3 are in communication or not in communication.

In some embodiments, the material of the reservoir portion 3 comprises plastic. The plastic material which has a favorable deformation property, effectively absorb energy, and reduce a possibility of a sealing failure when subjected to a collision.

In some embodiments, the volume of the reservoir cavity 10 is greater than or equal to the capacity of the coolant in the cooling system 22. At the condition of a very serious leakage in the cooling system 22, the battery module 2 will not be soaked in the liquid as well, thereby enhancing the operational reliability of the battery pack.

Referring to FIGS. 1 to 9, in some embodiments, the reservoir portion 3 further comprises a protection portion 4 mounted on one side of the reservoir portion 3 away from the outside surface.

The protection portion 4 is, for example, a plate-like structure provided with an inner concave structure mated with the inner concave portion 31 of the reservoir portion 3, so as to completely wrap the outside of the reservoir portion 3, thereby reducing a possibility of failure of the reservoir portion 3 due to collision.

The protection portion 4 is configured to protect the reservoir portion 3, to prevent that the reservoir portion 3 is deformed and damaged due to collision.

In some embodiments, the protection portion 4 has a strength higher than that of the reservoir portion 3. The protection portion 4 entirely covers the reservoir portion 3.

Next, referring to FIGS. 12 to 16, some specific implementations of the reservoir cavity 10 formed inside the case 1 will be described.

Figure 12:
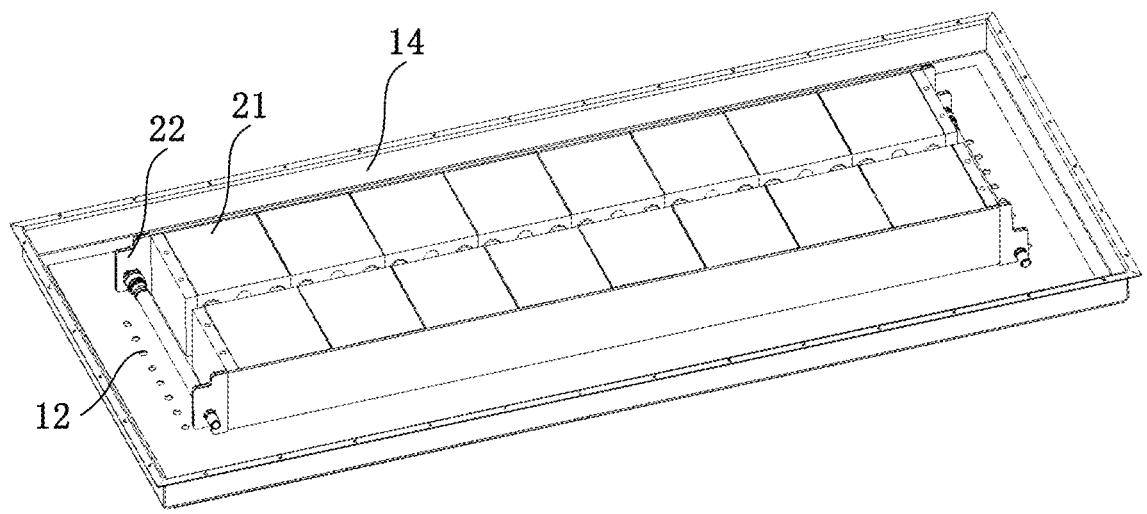
FIG. 12 is a schematic partial perspective structural view of a battery pack provided by some embodiments of the present disclosure.
Figure 13:
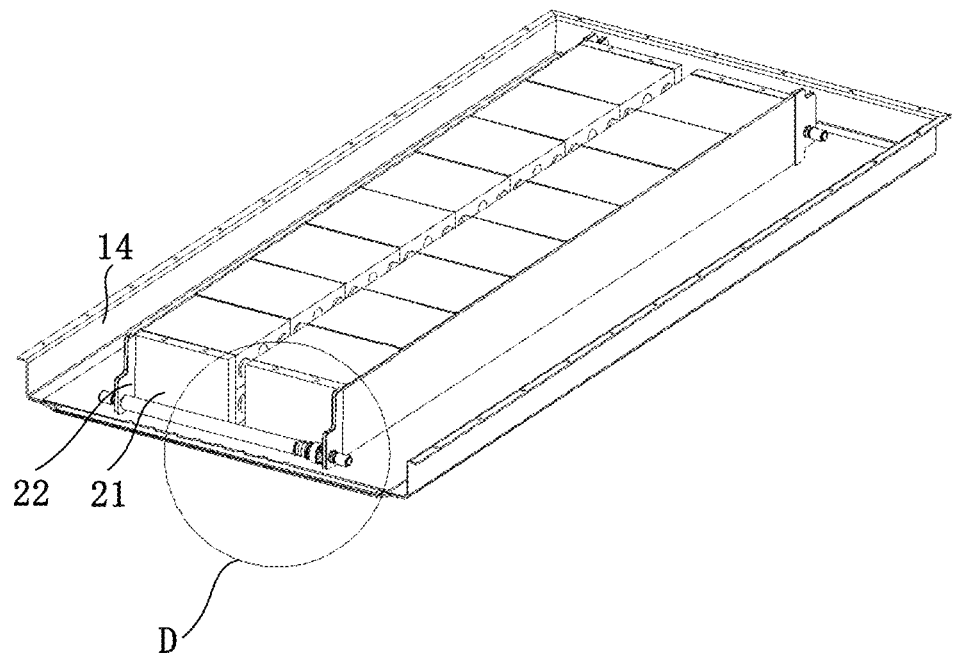
FIG. 13 is a schematic partial perspective structural view of a battery pack provided by some embodiments of the present disclosure.
Figure 14:
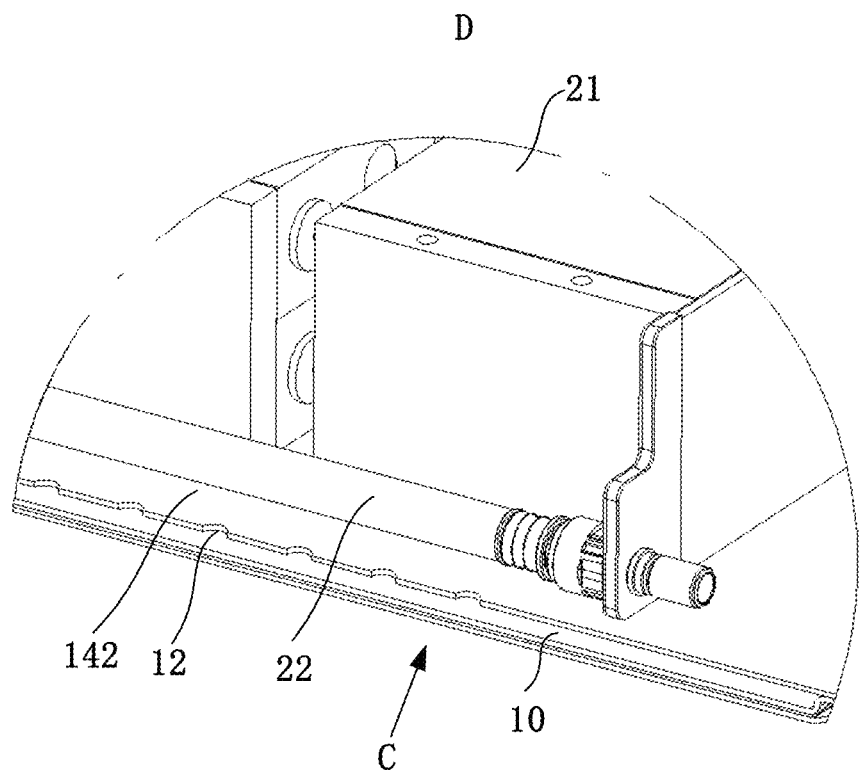
FIG. 14 is a partially enlarged schematic view of D in FIG. 13.
Figure 15:
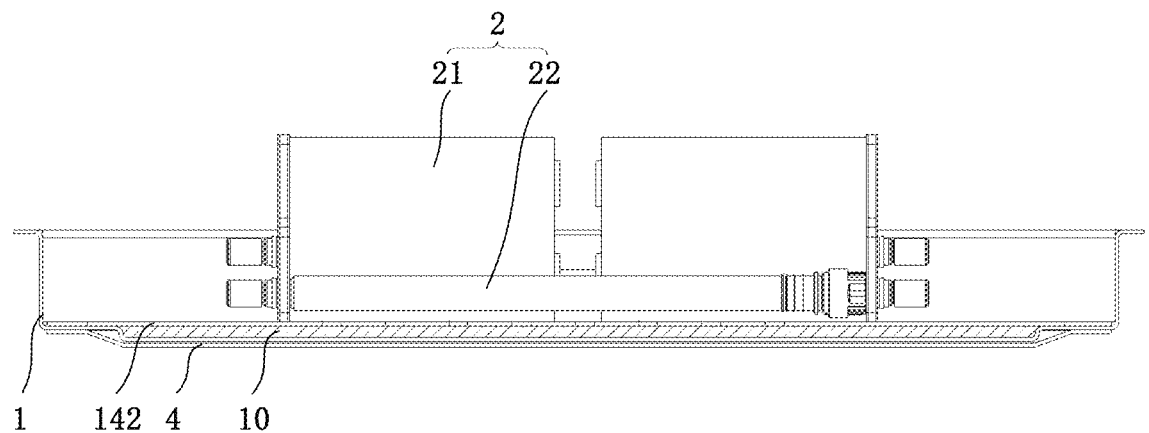
FIG. 15 is a schematic partial cross-sectional view along a C direction in FIG. 14.

Referring to FIGS. 12 and 13, the case 1 comprises a case body 141 and a carrier 142 disposed inside the case body 141. The carrier 142 divides the internal space of the case 1 into the accommodating cavity 11 and the reservoir cavity 10. The carrier 142 is provided with a drain hole 12, and the battery module 2 is mounted on the carrier 142.

The carrier 142 is, for example, flat shaped. The carrier 142 is welded or bolted to the inner wall of the case 1. The above-described structure makes a more compact and lightweight structure of the battery pack.

The functions of the accommodating cavity 11 and the reservoir cavity 10 are the same as those introduced above. The accommodating cavity 11 is configured to mount the battery module 2. The reservoir cavity 10 is configured to store fluid leaking from the accommodating cavity 11. Please refer to the above-described for other content.

Figure 16:
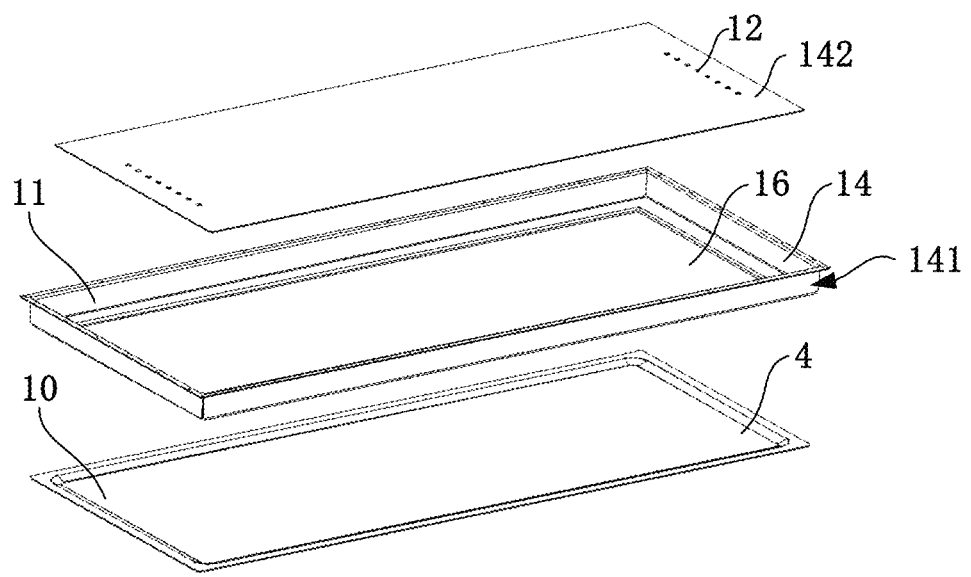
FIG. 16 is a schematic exploded structural view of a carrier, a second case, and a protection portion of a battery pack provided by some embodiments of the present disclosure.

Referring to FIGS. 12, 13, and 16, the bottom of the case 1 is provided with an inner concave area 16, and the carrier 142 is mounted at an edge of the inner concave area 16. The inner concave area 16 is a part of the case 1. The above-described arrangement is used to simplify the machining, and make a stable and reliable structure of the reservoir cavity 10.

Referring to FIG. 12, the exterior of the reservoir cavity 10 is provided with a protection portion 4 for covering the outer wall of the reservoir cavity 10.

The protection portion 4 for example has a strength higher than that of the outer wall of the reservoir cavity 10. The protection portion 4 is configured to protect the outer wall of the reservoir cavity 10 to reduce a possibility of a leakage risk of the reservoir cavity 10 in the event of a collision or the like, and to ensure normal use of the battery pack.

It may be understood that, in the above-described various embodiments, as long as they are not contradictory, it is possible to refer to or combine the relevant content of the remaining embodiments, so as to implement that the reservoir cavity 10 is partially located inside the case 1 and partially located outside the case 1.

Finally, it should be noted that the above embodiments are only used to illustrate the technical solutions of the present disclosure rather than limiting the same; although the present disclosure has been described in detail with reference to the foregoing embodiments, those skilled in the art should understand that, they may still amend the technical solutions recited in the foregoing various embodiments, or make equivalent replacement to partial technical features therein. However, such amendments or replacements do not make the essence of the corresponding technical solutions depart from the spirit and scope of the technical solutions of the various embodiments of the present disclosure.

The invention claimed is:

1. A battery pack, comprising:
   a case (1), comprising an accommodating cavity (11) and at least two drain holes (12) in communication with the accommodating cavity (11); and
   a battery module (2) mounted inside the accommodating cavity (11);
   wherein a reservoir cavity (10) is provided below the battery module (2) to store a liquid, and in communication with the drain holes (12),
   wherein the battery module (2) comprises:
      a battery cell assembly (21) comprising a plurality of battery cells (210) arranged side by side; and
      a cooling system (22) abutting against the plurality of battery cells (210) and configured to cool each of the battery cells (210), wherein there is water in the cooling system (22),
   wherein the drain holes (12) are configured to discharge a fluid leaked by the cooling system (22),
   wherein the volume of the reservoir cavity (10) is greater than or equal to the capacity of a coolant in the cooling system (22),
   wherein the size of an opening of one of the drain holes (12) on one end in communication with the accommodating cavity (11) is greater than the size of an opening of another one of the drain holes (12) on the other end in communication with a reservoir portion (3),
   wherein the reservoir portion (3) is disposed outside the case (1), and
   wherein the reservoir portion (3) is provided with the reservoir cavity (10), or the reservoir portion (3) and the case (1) jointly form the reservoir cavity (10),
   wherein the reservoir portion (3) is mounted below a wall (15) of the case (1) provided with one of the drain holes (12), and is sealingly connected with the wall (15), and
   wherein the reservoir portion (3) and the wall (15) enclose the reservoir cavity (10).

2. The battery pack according to claim 1, wherein the reservoir portion (3) is provided with an inner concave portion (31) recessed in a direction away from the case (1).

3. The battery pack according to claim 2, wherein the inner concave portion (31) is located outside all of the drain holes (12) and covers all of the drain holes (12).

4. The battery pack according to claim 1, further comprising:
   a protection portion (4) mounted on one side of the reservoir portion (3) away from the case (1).

5. The battery pack according to claim 4, wherein the protection portion (4) has a hardness greater than that of the reservoir portion (3), and the protection portion (4) entirely covers the reservoir portion (3).

6. The battery pack according to claim 1, wherein the case (1) comprises:
   a first case (13); and
   a second case (14) enclosing the accommodating cavity (11) with the first case (13) and located below the first case (13); wherein at least one of the drain holes (12) is provided in the second case (14).

7. The battery pack according to claim 6, wherein the second case (14) comprises:
   a case body (141); and
   a carrier (142) disposed inside the case body (141); wherein the carrier (142) divides an inner space of the case (1) into the accommodating cavity (11) and the reservoir cavity (10); the carrier (142) is provided with one of the drain holes (12), and the battery module (2) is carried by the carrier (142).

8. The battery pack according to claim 7, wherein a bottom of the case body (141) is provided with an inner concave area (16) recessed in a direction away from the first case (13), and the carrier (142) is connected with an edge of the recessed area (16).

9. The battery pack according to claim 1, wherein the cooling system (22) comprises:
   at least two cooling plates (221), wherein each of the at least two cooling plates (221) is provided with cooling flow passages; and
   a connecting pipe (222) in communication with the cooling flow passages of each of the at least two cooling plates (221), wherein the drain holes (12) are adjacent to a connection of the cooling plate (221) and the connecting pipe (222).

10. The battery pack according to claim 1, wherein all of the battery cells (210) of the battery module (2) are arranged along a length direction of the case (1), and a maximum lateral surface of each of the battery cells (210) and the wall (15) in which the drain holes (12) of the case (1) are located face towards each other.

11. The battery pack according to claim 1, wherein the drain holes (12) are arranged along a width direction of the case (1).

* * * * *